US012608745B1

(12) United States Patent
Barry et al.

(10) Patent No.: US 12,608,745 B1
(45) Date of Patent: Apr. 21, 2026

(54) METHOD, APPARATUS AND SYSTEM FOR FEE STAMPING OF TRADE MESSAGES

(71) Applicant: BGC PARTNERS, L.P., New York, NY (US)

(72) Inventors: Erik Barry, Laurel Hollow, NY (US); Robert Allen, Miami Shores, FL (US); Matt Troy, Montauk, NY (US); Bijoy Paul, New York, NY (US); Nicholas Glass, Chatham, NJ (US)

(73) Assignee: BGC PARTNERS, L.P., New York, NY (US)

( * ) Notice: Subject to any disclaimer, the term of this patent is extended or adjusted under 35 U.S.C. 154(b) by 0 days.

(21) Appl. No.: 18/596,735

(22) Filed: Mar. 6, 2024

Related U.S. Application Data

(60) Provisional application No. 63/489,009, filed on Mar. 8, 2023.

(51) Int. Cl.
  *G06Q 40/04* (2012.01)
(52) U.S. Cl.
  CPC ................................... *G06Q 40/04* (2013.01)
(58) Field of Classification Search
  CPC ....................................................... G06Q 40/04
  See application file for complete search history.

(56) References Cited

U.S. PATENT DOCUMENTS

| | | | | |
|---|---|---|---|---|
| 6,882,985 B1 * | 4/2005 | Kay | ........................ | G06Q 30/08 |
| | | | | 705/37 |
| 8,612,323 B1 * | 12/2013 | Frait | .................. | G06Q 30/0207 |
| | | | | 705/37 |

| | | | | |
|---|---|---|---|---|
| 2006/0095364 A1 * | 5/2006 | Hamilton | ............... | G06Q 40/04 |
| | | | | 705/37 |
| 2009/0150279 A1 * | 6/2009 | Hadar | .................... | G06Q 40/04 |
| | | | | 705/37 |

FOREIGN PATENT DOCUMENTS

| | | | | | |
|---|---|---|---|---|---|
| WO | WO-2009089358 A2 * | 7/2009 | ............. | G06Q 40/00 |
| WO | WO-2020180783 A1 * | 9/2020 | ............. | G06F 16/27 |

OTHER PUBLICATIONS

Miax International Holdings, Inc.,: Miax Pearl Options Exchange—Fee Schedule, Oct. 7, 2021, pp. 1-23 (Year: 2021).*
Fritsch et al.: A Note on Optimal Fees for Constant Function Market Makers, May 28, 2021, pp. 1-11 (Year: 2021).*
FIA-Coalition Greenwich survey of clearing industry shows strong support for operational improvements, FIA Market Voice, Mar. 8, 2022, Retrieved Mar. 1, 2024 from https://www.fia.org/marketvoice/articles/fia-coalition-greenwich-survey-clearing-industry-shows-strong-support.
CFTC Orders Morgan Stanley & Co. LLC to Pay $500,000 for Supervision Failures, Commodity Futures Trading Commission CFTC, Release No. 7621-17, Sep. 28, 2017, Retrieved Mar. 1, 2024 from https://www.cftc.gov/PressRoom/PressReleases/7621-17.
CFTC Orders Barclays Capital, Inc. to Pay $800,000 for Supervision Failures, Commodity Futures Trading Commission CFTC, Release No. 7419-16, Aug. 4, 2016, Retrieved Mar. 1, 2024 from https://www.cftc.gov/PressRoom/PressReleases/7419-16.

* cited by examiner

*Primary Examiner* — Bijendra K Shrestha

(57) ABSTRACT

System, method, and apparatus may determine exchange and clearinghouse fees for a client to an executed trade based on client fee instructions indicating real time fee rates in a trade message generated by an electronic trading exchange that executes the trade, without any additional information other than information in the trade message.

17 Claims, 4 Drawing Sheets

*10*

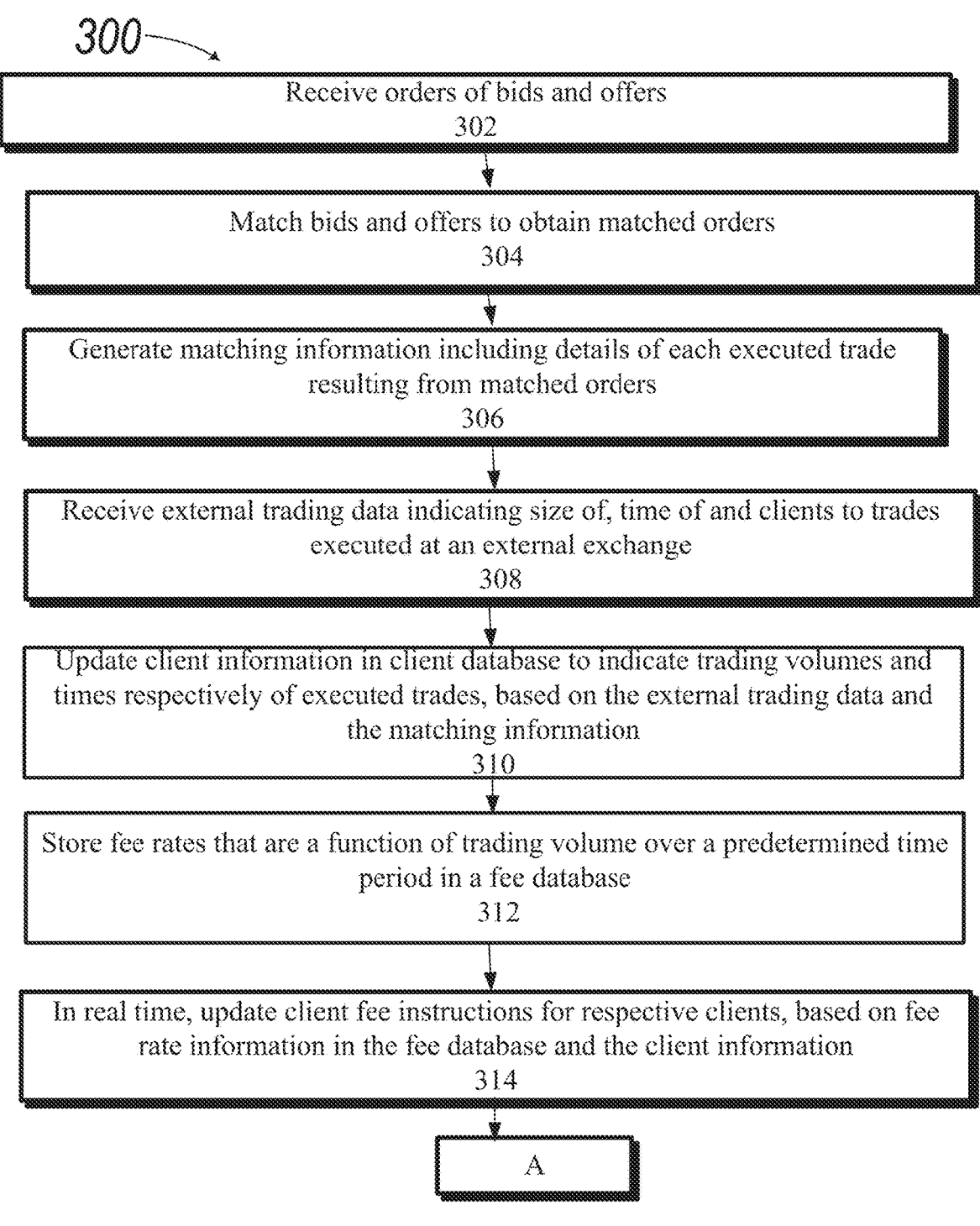

300

Receive orders of bids and offers
302

Match bids and offers to obtain matched orders
304

Generate matching information including details of each executed trade
resulting from matched orders
306

Receive external trading data indicating size of, time of and clients to trades
executed at an external exchange
308

Update client information in client database to indicate trading volumes and
times respectively of executed trades, based on the external trading data and
the matching information
310

Store fee rates that are a function of trading volume over a predetermined time
period in a fee database
312

In real time, update client fee instructions for respective clients, based on fee
rate information in the fee database and the client information
314

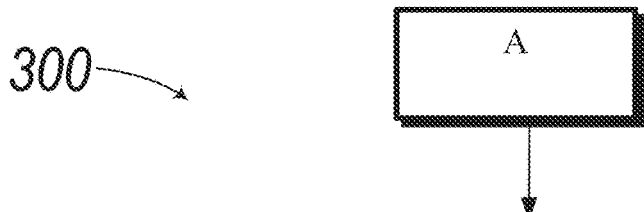

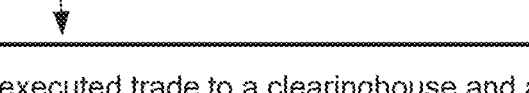

Generate, for each executed trade, a trade message including client fee instructions for respective clients to the executed trade that enable calculation of fees for the respective clients, desirably without additional information
316

Transmit the trade message for an executed trade to a clearinghouse and an executing broker
318

Calculate, from client fee instructions of a trade message, exchange and clearinghouse fees for each client to the executed trade of the trade message
320

FIG. 3B

METHOD, APPARATUS AND SYSTEM FOR FEE STAMPING OF TRADE MESSAGES

CROSS REFERENCE TO RELATED APPLICATIONS

This application claims the benefit of U.S. Provisional Application No. 63/489,009 filed Mar. 8, 2023, the contents of which is hereby incorporated herein by reference in its entirety.

TECHNICAL FIELD

The present disclosure generally relates generally to electronic trading systems, and more particularly, applying fees to trades executed at an electronic trading exchange of an electronic trading system.

BACKGROUND

Automated electronic trading exchanges facilitate execution of millions of trades for thousands of clients every day. Executing brokers submit orders of bids and offers for financial assets, such as financial instruments including securities and futures contracts, to the exchanges on behalf of clients. An electronic trading exchange matches an order of a bid and an order of an offer for a financial asset to obtain matched orders which result in an executed trade at the exchange. The clients that correspond to parties to an executed trade ordinarily pay an exchange fee to the exchange, and a clearing fee to a clearinghouse that clears the executed trade, settles trading accounts of the clients, and reports details of the executed trade to an executing broker(s) and a clearing broker.

In existing post-trade processing, which includes collection, confirmation, and reconciliation of fees for executed trades, determining the appropriate fee to apply to each client that is a party to an executed trade is a complex, resource intensive, multi-step process. An electronic trading exchange typically determines fee rates that are based on volume activity over a certain time period, such as a calendar year, generates fee schedules including the fee rates and distributes the fee schedules to a clearinghouse, executing brokers and a clearing broker. The fee schedules indicate fee rates to apply to a client that is a party to an executed trade, in accordance with, for example, a trader category, such as a liquidity provider or liquidity taker, of the client, trading volume of the client over a predetermined period, and a time in a particular time period, such as in a predetermined year or multi-month period, that the trade was executed. In addition, an electronic trading exchange generates and maintains client information schedules indicating trader category, and trading volume over a predetermined time interval, for respective clients, and distributes or otherwise makes available the client information schedules to the clearinghouse, executing brokers and clearing broker. The clearinghouse, executing brokers and clearing broker store in memory of computing devices the fee schedules and client information schedules for use in determining fees to be applied to clients respectively for executed trades. For each executed trade, an electronic trading exchange provides to a clearinghouse trade execution information, which includes identity of the financial asset of the executed trade, price and size of the executed trade, account information, such as account numbers, indicating identities of the clients that are parties to the executed trade and time of the executed trade. The clearinghouse forwards the trade execution information for the executed trade to an executing broker(s) and a clearing broker. The clearing broker, based on the trade execution information for the executed trade and the client information and fee schedules for the time period covering the date of the executed trade, determines exchange and clearing fees respectively for the clients of the executing broker(s) that are the parties to the executed trade. The clearing broker collects the fees from the clients, and pays the exchange and the clearinghouse respective exchange fees and clearing fees from the fees collected respectively from the clients.

As trader categories and trading volumes of clients that trade on the exchange may change over time, collection, and reconciliation of fees for executed trades requires ensuring that fee rates of a fee schedule specific to a client's trader category and trading volume for a particular period are applied to the client, in accordance with a time of the executed trade. Based on the very high volume of trading of some clients, and the processing steps needed to identify the appropriate fee schedule from which to determine the fee rates for clients that are parties to an executed trade, processing bottlenecks that do not permit timely processing of executed trades to complete calculation, collection and reconciliation of fees often occur. In addition, based on complexities in fee calculations, inaccurate fee calculations have resulted in fee overcharging of clients, which in turn has subjected clearing brokers to fines from governmental agencies for violations of security trading rules that require accurate fee charging. Further, substantial processing, memory and communication network resources are required at the exchange to facilitate generation, storage, maintenance, and distribution of multiple fee schedules for different trader categories and trading volumes applicable for different time periods, and multiple client information schedules applicable for different times for respective clients. In addition, clearinghouses and clearing brokers must store and maintain accessible the multiple fee and client information schedules, which requires usage of memory resources. Also, clearinghouses and clearing brokers must have substantial processing and bandwidth resources available to facilitate calculation of fees for clients that are respective parties to executed trades, in that the calculation includes, for each client that is a party to the executed trade, determining a fee schedule that is for a time period covering the time of an executed trade and corresponds to a trader category and volume activity over a predetermined time interval of the client as indicated in a client information schedule for the client for the time period, retrieving exchange and clearinghouse fee rates from the fee schedule, and calculating exchange and clearinghouse fees based on the exchange and clearinghouse fee rates and the volume of the executed trade.

Accordingly, there exists a need for method, apparatus and system that uses an improved computer and networking architecture to minimize processing resource usage, bandwidth usage, memory consumption and processing latencies, and to increase reliability, accuracy, efficiency, and speed of post-trade processing of fee calculation, reconciliation and collection for trades executed at an electronic trading exchange.

SUMMARY

In accordance with an aspect of the present disclosure, an electronic trading exchange apparatus may include a memory including a client database, a fee database and a client fee instruction database; and at least one processor configured to: receive, over a communication network, from a plurality of computing devices of respective clients, orders including bids and offers for financial assets; match bids and offers for financial assets of respective clients; generate matching information indicating executed trades resulting from matching orders of bids and offers for financial assets at the electronic trading exchange apparatus, in which the matching information indicates, for each executed trade, size and time of the executed trade and clients that are parties to the executed trade; receive in real time, over the communication network, external trading data indicating external executed trades resulting from matched orders of bids and offers for financial assets at another electronic trading exchange apparatus external to the electronic trading exchange apparatus, wherein the external trading data for a given external executed trade includes size and time of the given external executed trade and clients that are parties to the given external executed trade; update in real time, for each client in the client database, client information indicating a trading volume of the client and a time of the trading volume, in which the client information is updated based on the external trading data and the matching information; in real time, determine, for a given client in the client database, an updated client fee instruction based on fee rate information in the fee database and the client information for the given client in the client database, and update a client fee instruction for the given client in the client fee instruction database, in accordance with the updated client fee instruction for the given client; generate, for each executed trade, based on first and second client fee instructions in the client fee instruction database of respective first and second clients that are parties to the executed trade, first and second trade messages respectively including the first and second client fee instructions and identification information identifying the first and second clients, in which each of the first and second trade messages includes time, size and price of the executed trade, and in which the first and second client fee instructions are configured to enable calculation of first and second fees respectively for the first and second clients for the executed trade without additional information other than information in the first and second trade messages; and transmitting, over the communication network, the first and second trade messages for each executed trade to a clearinghouse device.

In accordance with an aspect of the present disclosure, a method for electronic trading may include controlling, by at least one processor of an electronic trading exchange apparatus, apparatus, in which the electronic trading exchange apparatus includes a memory including a client database, a fee database and a client fee instruction database; receiving, over a communication network, from a plurality of computing devices of respective clients, orders including bids and offers for financial assets; matching bids and offers for financial assets of respective clients; generating matching information indicating executed trades resulting from matching orders of bids and offers for financial assets at the electronic trading exchange apparatus, in which the matching information indicates, for each executed trade, size and time of the executed trade and clients that are parties to the executed trade; receiving in real time, over the communication network, external trading data indicating external executed trades resulting from matched orders of bids and offers for financial assets at another electronic trading exchange apparatus external to the electronic trading exchange apparatus, wherein the external trading data for a given external executed trade includes size and time of the given external executed trade and clients that are parties to the given external executed trade; updating in real time, for each client in the client database, client information indicating a trading volume of the client and a time of the trading volume, in which the client information is updated based on the external trading data and the matching information; in real time, determining, for a given client in the client database, an updated client fee instruction based on fee rate information in the fee database and the client information for the given client in the client database, and updating a client fee instruction for the given client in the client fee instruction database, in accordance with the updated client fee instruction for the given client; generating, for each executed trade, based on first and second client fee instructions in the client fee instruction database of respective first and second clients that are parties to the executed trade, first and second trade messages respectively including the first and second client fee instructions and identification information identifying the first and second clients, in which each of the first and second trade messages includes time, size and price of the executed trade, and in which the first and second client fee instructions are configured to enable calculation of first and second fees respectively for the first and second clients for the executed trade without additional information other than information in the first and second trade messages; and transmitting, over the communication network, the first and second trade messages for each executed trade to a clearinghouse device.

BRIEF DESCRIPTION OF THE DRAWINGS

FIGS. 3A and 3B illustrate an exemplary high level flow diagram of a method for generating and transmitting a trade message for an executed trade including client fee instructions, according to the present disclosure.

DETAILED DESCRIPTION

Figure 1:
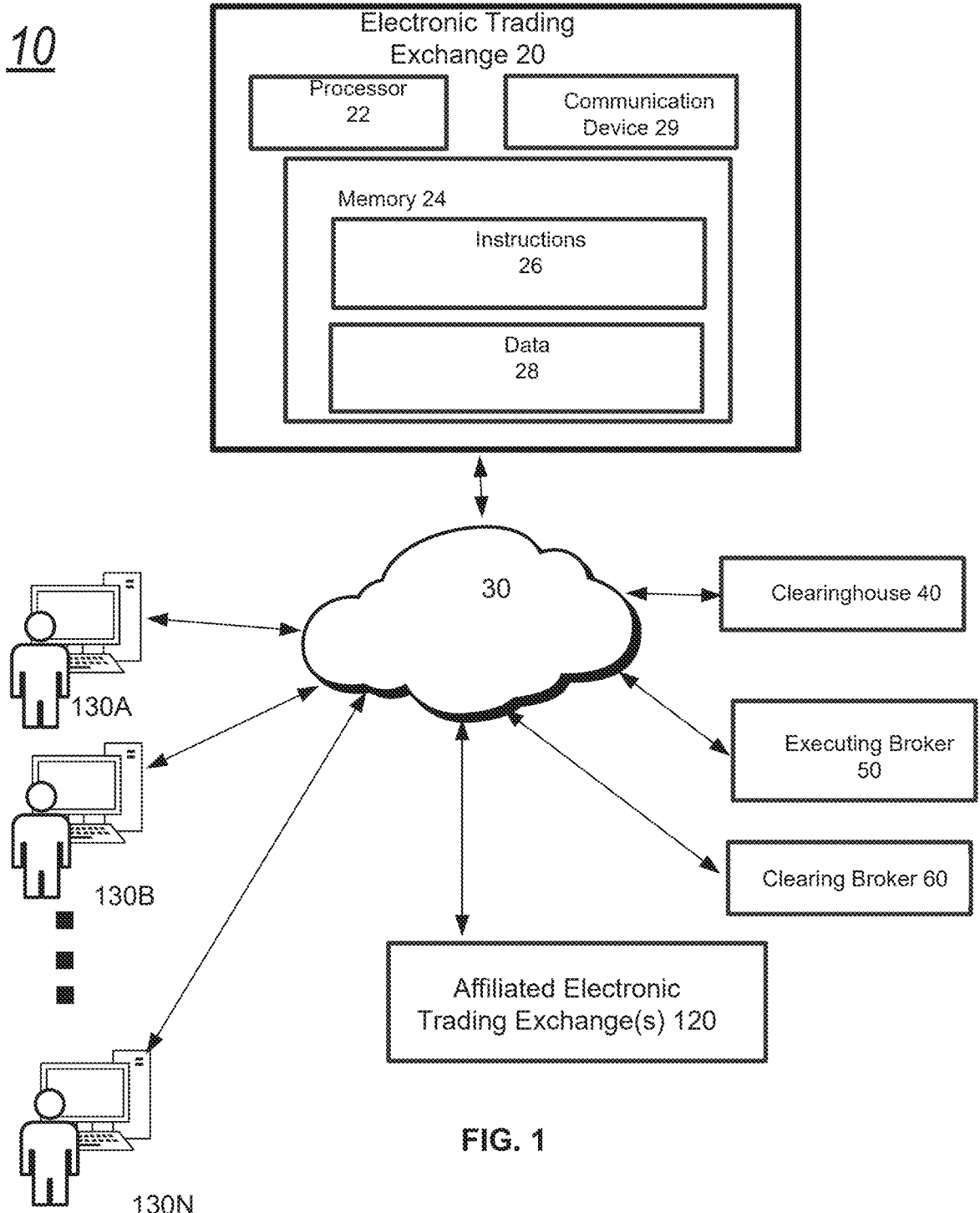
FIG. 1 is a block diagram of an exemplary electronic trading system, according to the present disclosure.

The technology of the present disclosure relates to, by way of example, a computer and networking architecture that may control determining fee rates for clients that are parties to an executed trade resulting from matching of orders for a financial asset at an electronic trading exchange, where the fee rates for the clients are based on current trading volumes respectively of the clients over a predetermined time interval, and generating trade messages for the executed trade respectively including client fee instructions for the clients that enable calculation of fees for the executed trade respectively for the clients from the fee rates which are indicated in the client fee instructions. In one embodiment, the fees for a client that is a party to the executed trade may be calculated from fee rates of client fee instructions of the trade message for the executed trade, and other information of the trade message for the executed trade, without the need to obtain any additional information other than information in the trade message. It is to be understood that in the present disclosure, and as described in further detail below, information that configures a computing device to calculate a fee for a client that is a party to an executed trade, such as information that configures a fee calculation equation and indicates instructions that the computing device executes to calculate a fee with the fee calculation equation using size of the executed trade and a fee rate for the client obtained from a trade message for the executed trade, does not constitute additional information other than information in the trade message. For ease reference, clients that are parties to an executed trade are sometimes referred to herein as clients to an executed trade.

In view of the foregoing, in an exemplary embodiment, a system, apparatus, method and non-transitory computer readable medium for electronic trading may match orders of bids and offers for financial assets received over a communication network at an electronic trading exchange apparatus; generate matching information indicating accounts of respective clients to, and sizes, prices and times of, executed trades resulting from matching of orders of bids and offers for financial assets at the electronic trading exchange apparatus; in real time receive external trading data indicating accounts of respective clients to, and sizes, prices and times of, external executed trades resulting from matched orders for financial assets at another electronic trading exchange apparatus external to the electronic trading exchange apparatus; in real time update, based on the external trading data and the matching information, client information for accounts of respective clients indicating trading volumes and times at which the trading volumes occurred; in real time update a client fee instruction for a client based on the client information for the client and fee rate information; generate, for each client to a trade executed at the electronic trading exchange apparatus, a trade message for the executed trade including client fee instructions for the client to the executed trade, where the client fee instructions indicate fee rates and are configured to enable calculating fees for the executed trade for the client from the fee rates, desirably without additional information other than information in the trade message; and transmit, over the communication network, the trade messages respectively for the clients to the executed trade to a clearinghouse and an executing broker(s), where the clearinghouse forwards the trade messages to a clearing broker.

Advantageously, the technical problem of determining fees owed to an exchange and a clearinghouse from respective clients to an executed trade resulting from matching of orders for a financial asset received at an electronic trading exchange, accurately, with low latency and minimal usage of processing, memory and bandwidth resources, is solved by the technical solution of the present disclosure that includes, in a trade message transmitted by an electronic trading exchange for a trade executed at the electronic trading exchange, client fee instructions indicating real time fee rates for a client to the executed trade at the time of the executed trade and that enable calculation of fees for the client to the executed trade, desirably without additional information other than information in the trade message, which permits reduced usage of processing, memory and bandwidth resources at a computing device serving as the electronic trading exchange, as well as at computing devices respectively serving as a clearinghouse, a clearing broker and an executing broker and which in combination with the electronic trading exchange form an electronic trading system.

Although an exemplary embodiment of the present disclosure is described herein as applicable to U.S. Treasury bond or note futures contracts as the financial assets, it is to be understood that the features in accordance with the present disclosure may be applied to various financial assets including securities, derivatives contracts including interest rates, swaps, equities, indices, exchange traded funds, futures commodity contracts or single stock futures contracts, and cryptocurrency contracts.

The present disclosure may be implemented using a combination of computer hardware and computer software to form a specialized machine capable of performing operations. Embodiments of the present disclosure may be performed utilizing a combination of central processing units (CPUs), physical memory, physical storage, electronic communication ports, electronic communication lines and other computer hardware. The computer software may include at least a computer operating system and specialized computer processes described herein.

In the present disclosure below, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with a computer system embodied as a component of an electronic trading system have not been shown or described in detail to avoid unnecessarily obscuring descriptions of the embodiments.

The aspects, features and advantages of the present disclosure will be appreciated when considered with reference to the following description of examples and accompanying figures. In describing the exemplary embodiments of the disclosure illustrated in the drawings, specific terminology will be used for the sake of clarity. However, the disclosure is not intended to be limited to the specific terms used.

Example Systems

FIG. 1 illustrates a block diagram of an exemplary electronic trading system 10, in accordance with the present disclosure. The system 10 may include a computing apparatus 20 as an electronic trading exchange communicatively coupled over a communication network 30 with a computing device 40 as a clearinghouse, a computing device 50 as an executing broker, a computing device 60 as a clearing broker, one or more computing apparatuses 120 as one or more electronic trading exchanges affiliated with and external to the computing apparatus 20, and a plurality of computing devices 130A, 130B . . . 130N of respective users. For ease of reference and to clearly illustrate features of the invention, the computing devices 40, 50 and 60 may be referred to herein as clearinghouse 40, executing broker 50 and clearing broker 60, respectively, and the computing apparatus 20 and computing apparatuses 120 may be referred to herein respectively as exchange 20 and affiliated exchanges 120.

The exchange 20 may operate as an electronic asset matching engine that matches orders of bids and offers of respective users for financial assets, such as U.S. Treasury bond futures contracts. The orders may be received at the exchange 20 over the communication network 30 from the executing broker 50. The executing broker 50 may receive the orders from computing devices 130 of respective clients of the executing broker 50, and forward the orders to the exchange 20 for matching with respective contra orders. The exchange 20 may be configured to generate, for each order received, a client fee identifier that uniquely identifies the client that submitted the order. In addition, the exchange 20 may be configured to generate, and transmit over the communication network 30 to the executing broker 50, and optionally a computing device 130 of a client, for each order accepted, an order acceptance message indicating order information of the order and the client fee identifier assigned to the client that submitted the order.

In addition, the exchange 20 may be configured to match orders of a bid and offer for a financial asset to obtain matched orders which are processed to result in an executed trade at the exchange 20. The exchange 20 may generate, and transmit to the clearinghouse 40, the executing broker 50 and the clearing broker 60 over the communication network 30, for each executed trade, information indicating details of the executed trade. The clearinghouse 40 may validate and clear (finalize) the executed trade, ensuring that both buyer and seller clients honor their contractual obligations. The clearing broker 60, to whom the executing broker 50 may allocate the executed trade, may report the executed trade, including any fees owed to the exchange and a clearinghouse, to a client(s). The clearing broker 60 may collect the exchange and clearinghouse fees from the clients to the executed trade. In addition, the clearing broker 60 may facilitate payment to the exchange 20 and clearinghouse 40 of the exchange fees and clearinghouse fees collected respectively from the clients.

In accordance with the present disclosure, the exchange 20 may perform processing functions that control updating in real time of client fee instructions respectively for clients of executing brokers that submit orders to the exchange 20, where the client fee instructions indicate a real time, current fee rate for a client to an executed trade; and generating, for each client to an executed trade, a trade message which includes the client fee instructions for the client to the executed trade and enables calculating fees for the client to the executed trade, desirably without additional information other than information in the trade message. The inclusion in a trade message of client fee instructions, in other words, fee stamping of the trade message with fee rates for a client to the executed trade of the trade message, that enables calculating fees for the client to the executed trade without additional information other than information in the trade message, solves the technical problems of requiring usage of substantial memory, processing and bandwidth resources to accurately calculate fees for a client to an executed trade based on a current trader category and trading volume history of the client at a time of the executed trade, by a technical solution that advantageously reduces processing, memory storage and bandwidth resource usage, and processing latency associated with accurately determining fees for a client to an executed trade and reconciling and collecting from the client the fees for the executed trade, as described in detail below.

Referring to FIG. 1, the exchange 20 may be in the form of a computing device that includes one or more processors 22, one or more memory 24, and other components commonly found in computing devices. In one embodiment, the one or more processors 22 may include or be configured to operate as one or more servers.

The memory 24 may store information accessible by the one or more processors 22, including instructions 26 that may be executed by the one or more processors 22, and data 28.

The one or more processors 22 may include an architecture configured to include a programmable hardware device, a programmable integrated circuit, an application specific integrated circuit ("ASIC"), or system on chip ("SoCs"). In one embodiment, the architecture may be hardwired on a substrate. In one embodiment, the one or more processors 22 may include any type of processor, such as a CPU from Intel, AMD, and Apple.

The memory 24 may store information accessible by the one or more processors 22, including the instructions 26 that may be executed by the one or more processors 22. The data 28 may be used for executing the instructions 26 and/or for performing other functions. The memory 24 may be any type of non-transitory media readable by the one or more processors, such as a hard-drive, solid state hard-drive, memory card, ROM, RAM, DVD, CD-ROM, write-capable, read-only memories, etc.

The instructions 26 may be any set of instructions capable of being read and executed by the one or more processors 22. The instructions may be stored in a location separate from the computing device, such as in a network attached storage drive, or locally at the computing device. The terms "instructions," "functions," "application," "steps," and "programs" may be used interchangeably herein. The instructions residing in a non-transitory memory may comprise any set of instructions to be executed directly (such as machine code) or indirectly (such as scripts) by processor 22. In this regard, the terms "instructions," "scripts," or "modules" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

Data 28 may be stored, retrieved and/or modified by the one or more processors 22 in accordance with the instructions 26. Such data may be stored in one or more formats or structures, such as in a relational or non-relational database, in a SQL database, as a table having many different fields and records, XLS, TXT, or XML documents. The data may also be formatted in any computing device-readable format. In some embodiments the data may be encrypted.

The exchange 20 may include a communication device 29 configured to provide wired or wireless communication capabilities. In one embodiment, the exchange 20 may be configured to transmit, via a device of the exchange 20 having communication capabilities, such as the communication device 29, a trade message as described in detail herein using a binary market protocol format, such as Financial Information exchange (FIX®) protocol or FIXML protocol, or any suitable message protocol format.

The communication network 30 may be a local area network ("LAN"), a wide area network ("WAN"), or the Internet, etc. The communication network 30 and intervening nodes thereof may use various protocols including virtual private networks, local Ethernet networks, private networks using communication protocols proprietary to one or more companies, cellular and wireless networks, HTTP, and various combinations of the foregoing. In addition, the network 30 may be configured to facilitate communication using a variety of networking protocols now available or later developed including, but not limited to, FIX and FIXML protocol.

FIG. 1 illustrates the components of the exchange 20 as being single components, however, the components may comprise multiple programmable hardware devices such as processors, computers, computing devices, or memories that may or may not be stored within the same physical housing. For example, the memory may be a hard drive or other storage media located in housings different from that of the computing apparatus that constitutes the exchange 20. Accordingly, references to a programmable hardware device, processor, computer, computing device, or memory herein will be understood to include references to a collection of processors, computers, computing devices, or memories that may or may not operate in parallel. Further, although some functions described below are indicated as taking place on a single computing device having a single processor, various aspects of the subject matter described herein may be implemented by a plurality of computing devices in series or in parallel. For example, in one embodiment, functions performed by the computing apparatus of the exchange 20 as described below may at least be partially performed at another computing apparatus having the same or similar components as the computing apparatus of the exchange 20. In one embodiment, functions described herein as performed by the computing apparatus of the exchange 20 may be distributed among one or more computing devices (servers) that operate as a cloud system.

Although only a single computing apparatus 20 (computer) is depicted herein, it should be appreciated that a computing apparatus in accordance with the present disclosure may include additional interconnected computers and reprogrammable hardware devices. It should further be appreciated that computing apparatus 20 may be an individual node in a network containing a larger number of computers.

In one embodiment, the computing apparatus 20 may include all the components normally used in connection with a computer. For example, computing apparatus 20 may have a keyboard and mouse and/or various other types of input devices such as pen-inputs, joysticks, buttons, touch screens, etc., as well as a display, which could include, for instance, a CRT, LCD, plasma screen monitor, TV, projector, etc.

The computing devices 130 may be configured to be operable by users, or automatically, to submit, over the communication network 30 to the executing broker 50, orders of bids and offers for a financial asset. For example, the financial asset may be a U.S. Treasury bond futures contract.

Each of the computing devices 40, 50 and 60 may include a processor, a memory and communication capabilities, and also all the components normally used in connection with a computer.

The computing device 40 may be configured to perform functions of a clearinghouse, including receiving over the communication network 30 trade information for an executed trade from an exchange, such as the exchange 20, and performing operations to facilitate settling and clearing of the executed trade. The clearinghouse 40 may determine clearinghouse fees owed by a client to an executed trade, based on fee information provided thereto as client fee instructions as described in detail below.

The computing device 50 may be configured to perform functions of an executing broker, which include receiving over the communication network 30 orders for a financial asset from computing devices 130 of clients, submitting orders to the exchange 20 over the communication network 30, receiving over the communication network 30 information indicating details of an executed trade based on the submitted orders, and communicating over the communication network 30 executed trade details, including fees owed by clients to the executed trade, to the clients at the computing devices 130.

The computing device 60 may be configured to perform functions of a clearing broker, which include receiving over the communication network 30 information indicating details of an executed trade at the exchange 20, determining fees owed by clients to the executed trade, communicating with the clients at the computing devices 130 over the communication network 30 to facilitate collection of the fees owed, and facilitating payment of the fees owed for the executed trade to the exchange and the clearinghouse based on the collected fees.

Each computing apparatus 120 may include a processor, a memory and communication capabilities, and also components normally used in connection with a computer. In one embodiment, the computing apparatus 120 may be configured as an electronic trading exchange having the same or similar construction and operation as the computing apparatus 20. Each affiliated exchange 120 may be external to the exchange 20 and constitute a separate and distinct exchange at which executed trades may result from matching of orders at the affiliated exchange 120. The affiliated exchange 120 may transmit, over the communication network 30 to the computing apparatus 20, external trading data for each external trade executed at the affiliated exchange. The external trading data may include, for each external executed trade, account information of clients to the external executed trade, size and price of a financial asset that is the subject of the external executed trade, and time that the external executed trade occurred at the affiliated exchange 120. For example, the external executed trade may be for ten, 2-year U.S. Treasury bond futures contracts having a price of $1000. As discussed below, the exchange 20 may use external trading data to update client fee instructions in a client fee instruction database from which client fee instructions may be provided with other trade information in a trade message for a trade executed at the exchange 20, to enable calculation of fees for a client for the executed trade accurately, quickly and with minimal processing and memory and bandwidth resource usage, based on fee information included in the client fee instruction of the trade message.

It is to be understood that each of the exchanges 120 may perform the same or similar functions as described below for the exchange 20, namely, transmit a trade message for an executed trade including client fee instructions that contain fee information from which real time fees for a client to the executed trade may be determined accurately, quickly and with minimal processing and memory and bandwidth resource usage, desirably without additional information other than information in the trade message for the executed trade. However, for simplicity and clarity, the features of the present invention are described below in connection with operations performed by the exchange 20.

Figure 2:
FIG. 2 is a block diagram of an exemplary electronic trading exchange apparatus, according to the present disclosure.
Figure 2:
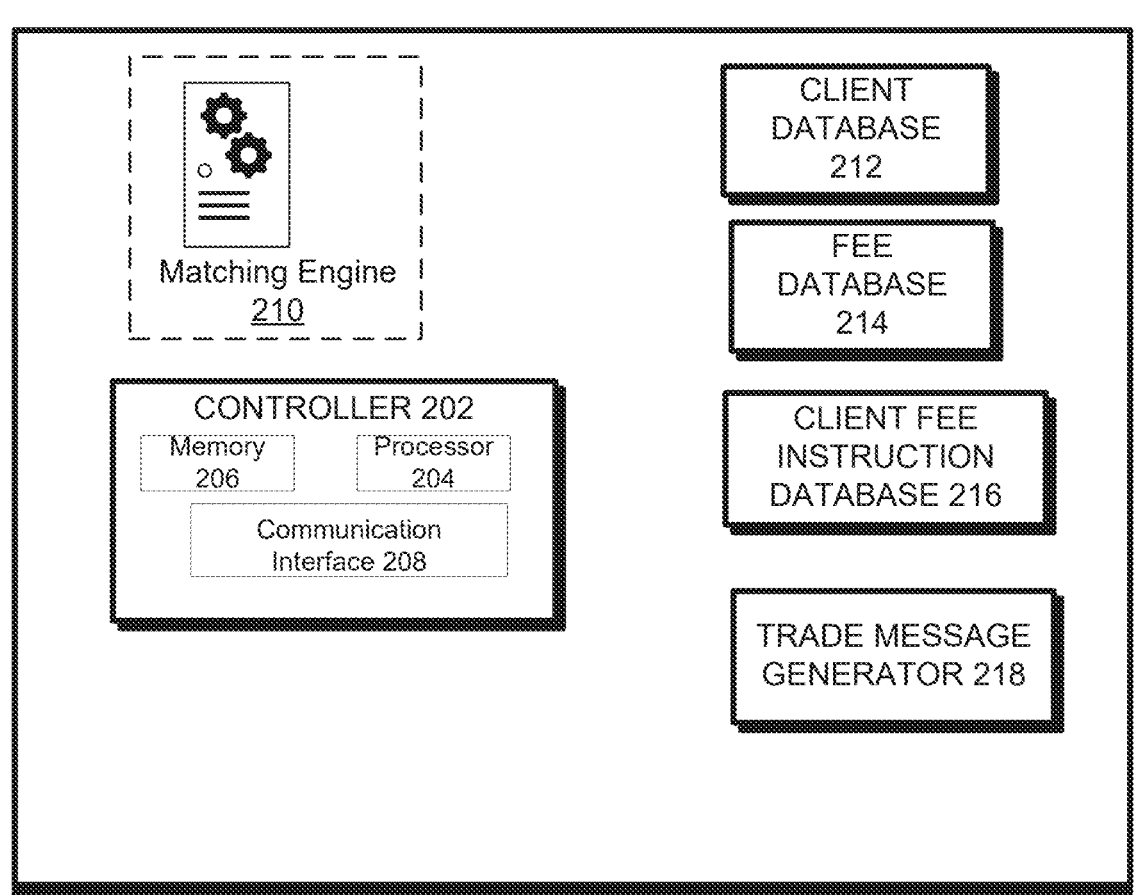

Referring to FIG. 2, in one embodiment, the exchange 20 may be configured as a computing apparatus 200 to implement specific functions and operations in accordance with the present disclosure. The computing apparatus 200 may be programmed with programs to perform some or all of the functions and operations described herein. The computing apparatus 200 may be referred to herein as the exchange 200, for ease of reference and clarity of description. In addition, to highlight features of the present disclosure, an exemplary embodiment is described herein where the exchange 200 constitutes the exchange 20 within the system 10.

Referring to FIG. 2, the exchange 200 may include a controller 202 as a server, and the controller 202 may include a processor 204, a memory 206 and a communication interface 208. The memory 206 may be configured to store instructions to implement specific functions and operations, and data related to processing trade related information including client fee identifiers, client trading activity information, fee rate information and client fee instructions, and to generating and transmitting trade messages including client fee instructions indicating fee rates that enable calculation of fees for respective clients to executed trades indicated in the trade messages, desirably without additional information other than the information respectively in the trade messages. The communication interface 208 may include components that provide network communication capabilities. In one embodiment, each of the components of the exchange 200 may include a processor and a memory including instructions that implement functions of the respective component, as described below.

For ease of reference and convenience, the disclosure herein that the controller 202 or another component of the exchange 200 may perform a function or operation, is a disclosure that a processor or circuitry of the controller 202 or the another component of the exchange 200 may perform or control the performance of the function or operation.

The computing apparatus 200 may include a matching engine 210, a client database 212, a fee database 214, a client fee instruction database 216 and a trade message generator 218.

The controller 202 may be communicatively coupled with the matching engine 210, the client database 212, the fee database 214, the client fee instruction database 216 and the trade message generator 218. In one embodiment, at least a portion of each of the client database 212, the fee database 214, and the client fee instruction database 216 may be a part of the memory 206.

Referring also to FIG. 1, the processor 204 may be configured to control receiving, over the communication network 30 via the communication interface 208, an order for a financial asset. In one embodiment, the executing broker 50 may receive the order from a computing device 130 of a user that is a client of the executing broker 50, and then transmit the order to the exchange 200 over the communication network 30. In one embodiment, the client may operate the computing device 130 to transmit the order, over the communication network 30, to the executing broker. In one embodiment, the executing broker 50 may automatically generate, and transmit over the communication network 30 to the exchange 200, an order on behalf of a client. The order may identify a financial asset, such as a financial instrument of a U.S. Treasury bond futures contract, as the subject of the order; a side of the order, namely, bid (buy) or sell (offer); account information indicating an identity of the client of the executing broker for which the order is placed; price and size of the order; the exchange on which to place the order, etc.

The processor 204 may be configured to assign a client fee identifier that uniquely identifies a client associated with an order received from the executing broker 50. The processor 204 may store in the memory 206 information included with orders ("order information") for respective orders received from the executing broker 50, where the order information for each order includes the client fee identifier of the client associated with the order, a financial asset that is the subject of the order and price and size of the order.

The matching engine 210 may be configured to retrieve, from the memory 206, order information for respective orders, and perform processing operations to match an order of a bid and an order of an offer for a financial asset. When the matching engine 210 identifies matching orders of a bid and an offer for a financial asset, the processor 204 may determine that matched orders exist, and perform processing to cause execution of a trade from the matched orders of the bid and offer.

When a trade is executed at the exchange 200, the processor 204 may generate matching information for the executed trade. Matching information for an executed trade may include client fee identifiers respectively of clients to the executed trade, type of financial asset, such as a futures or interest rate swap derivative contract, that is the subject of the executed trade, size and price of the financial asset that is the subject of the executed trade, time of the executed trade, and identification of the exchange 200. In one embodiment, the time of the executed trade may be a time of a world clock when the trade is executed, based on matched orders of a bid and an offer of respective parties. The processor 204 may store in the memory 206 matching information for each trade executed at the exchange 200.

In addition, the processor 204 may be configured to control receiving in real time, over the communication network 30, real time external trading data indicating external trades executed at the one or more affiliated exchanges 120. The external trading data may indicate, for each external executed trade, the financial asset that is the subject of the external executed trade, size and price of the external executed trade, type of the financial asset, such as a futures or interest rate swap derivative contract, that is the subject of the external executed trade, client fee identifiers respectively of clients to the external executed trade, time of the external executed trade and identification of the affiliated exchange at which the trade was executed.

The client database 212 may be configured to store client information for respective clients. The client information may indicate, for a given client as indicated by a client fee identifier, details of executed trades indicated in the matching information generated at the exchange 200, and details of executed trades indicated in the external trading data received from the exchanges 120 at the exchange 200. In one embodiment, the client database may include client information for each client of the executing broker 50, or any executing broker that submits orders for matching and execution as a trade at the exchange 200 or affiliated exchanges 120.

In one embodiment, the processor 204 may be configured to automatically, after each successive predetermined time interval, for example, once a day at a predetermined time after trading ends on the exchange 200, process the external trading data received at the exchange 200 and the matching information for trades executed at the exchange 200 during a previous time interval equal to the predetermined time interval, and determine, for each client to a trade executed during the previous time interval, trading information for the client during the previous time interval.

The processor 204 may be configured to store in the client database 212, as client information for the client, the trading information for the client from the previous time interval, or update the client information for the client in the client database 212 based on the trading information for the client during the previous time interval. In one embodiment, the processor 204 may determine volumes of trades executed for the client during the previous time interval and types of financial assets for executed trades having the respective volumes, and update the client information in the client database of the client to include or represent such information. For example, the client database may be configured to store, for a client, client information representative of a volume of executed trades of U.S. Treasury bond futures contracts within a predefined 3 month period, and a volume of executed trades for derivative interest rate swap contracts within the same predefined 3 month period. The client information for the client may be updated, for example, daily, to reflect the volume activity for the client within a predefined 3 month period as a sum of all volume of executed U.S. Treasury bond futures contracts during the 3 month period and a sum of all volume of executed derivative interest rate swap contracts with the predefined 3 month period, based on the external trading data and the matching information processed daily at the exchange 200.

In one embodiment, the processor 204 may store, in client information for a client in the client database, entries for each trade of the client executed at the exchange 200 or any of the exchanges 120. Each entry may indicate time of the executed trade, size and price of the executed trade, and type of the financial asset for the executed trade, as determined from the matching information and the external trading data processed by the processor 204. For example, an entry in the client information for an executed trade of a client may include Feb. 1, 2023 as time of the executed trade, 1000 as size of the executed trade, $100 as price of the executed trade, and a 2-year U.S. Treasury bond futures contract as the type of financial asset. In this embodiment, the volume activity for a client for a specific financial asset type over a predetermined time interval, such as three months, ending on the current day may be indicated in the client information for the client.

The fee database 214 may be configured to store fee rate information for assessing fees to clients to executed trades. The fee rate information may include an exchange fee rate and a clearinghouse fee rate. Each fee rate may be a function of, for example, one or more of: a trader category of a client; volume activity of the client for a predetermined time interval for a predetermined type of financial asset; rebates, incentives, fee waivers, fee caps or volume discounts based on a threshold trading volume; or other fee criteria. For example, the trader categories may include liquidity taker and liquidity provider, and types of financial asset may include U.S. Treasury bond futures contracts or derivative contracts. A fee rate may depend on the trader category, type of financial asset and volume activity over a predetermined time interval. For example, for a same volume threshold for a same predetermined time interval, such as a time interval from a current date and extending several months prior to the current date, a first fee rate may exist for a first trader category of a liquidity taker and a financial asset type of a futures contract, and a second fee rate may exist for a second trader category of a liquidity provider and the financial asset type of the futures contract. In one embodiment, the fee rate may be a function of one or more of rebates, incentives, fee waivers, fee caps, or volume discounts that are based on threshold volume of trading activity over a particular time period, such as a time interval extending several months previous to a predetermined date, and a trader category of the client, such as a liquidity provider or liquidity taker.

The processor 204 may receive fee rate information including fee rates, such as for the exchange or clearinghouse, over the communication network 30, from an external computing device (not shown in FIG. 1), and store the fee rate information in the fee database 214. Alternatively, the processor 204 may determine fee rate information from fee rate-related information received over the communication network 30, or manually input to the computing apparatus 200, and then store the fee rate information in the fee database 214.

In one example, the fee rate information may indicate a fee rate of 0.01 cents for each of the exchange fee and clearinghouse fee applicable to a client that is a liquidity provider and has a trading volume over the last 3 months of greater than 1,000,000 futures contracts. In addition, in another example, the fee rate information may indicate a less favorable fee rate of 0.10 cents for the exchange fee and 0.11 cents for the clearinghouse fee applicable to a client that is a liquidity provider and has a trading volume over the last 3 months of less than 100,000 futures contracts. It is to be understood that the fee rate information may indicate different fee rates to apply to a client, and depend on various factors including trading volume, time period of cumulative trading volume, and trader category of the client, or other fee criteria.

The client fee instruction database 216 may be configured to store client fee instructions for each client having client information in the client database 212. The client fee instructions may constitute real time, updated client fee instructions, which are based on current, real time data in the fee database and the client database. The client fee instructions may represent real time fee rates to be applied to clients to executed trades, and be based on real time information on trading activity of clients. The processor 204 may be configured to, in real time, automatically, at predetermined time intervals, such as once within every successive 24 hour time period, for example, at a predetermined time after the client fee information is updated and before a next period of trading commences at the exchange 20, determine an updated client fee instruction for each given client in the client database 212, based on the fee rate information in the fee database and the client information in the client database. In addition, the processor 204 may be configured to, in real time, update a client fee instruction for a client indicated in the client fee instruction database 216, based on the updated client fee instruction determined for the client. When the client fee instruction for a client in the client fee instruction database 216 does not include any data for the client, the updating of the client fee instruction for the client may constitute storing a currently determined fee rate as the client fee instruction for the client. When the client fee instruction for a client in the client fee instruction database 216 includes a fee rate, the updating of the client fee instruction may constitute replacing the existing fee rate with a newly determined fee rate for the client. For example, the processor 204 may retrieve, from the client information, a trading volume for a client over the last three months and a trader category of the client, and determine from the fee database an entry having a client fee instruction applicable to the client, based on the entry having the same trader category as the client in the client database 212 and corresponding to a trading volume for the last three months whose range encompasses the trading volume for the client in the client information. The processor 204 may update a client fee instruction for a client in the client fee instruction database 216, in the event the client fee instruction in the client fee instruction database 216 is empty, or not the same as the update to the client fee instruction.

In one embodiment, the processor 204 may be configured to determine trade volume for a client over a predetermined period from the client information, and based on the trade volume in the predetermined period, update a client fee instruction for the client based on an incentive or reward corresponding to the trade volume at a time in the predetermined period. For example, in the event a trade volume for a client reaches a threshold on a particular day during the predetermined period, the processor 204 may determine an updated client fee instruction that includes a fee discount for the client on the particular day. As a result, for respective first and second clients for which different trading volumes are accumulated in a predetermined period, the client fee instructions respectively thereof may be updated at different times based on the differences in trading volume activity during the predetermined period.

The trade message generator 218 may have communication capabilities and be configured to generate a trade message for each client to an executed trade which contains trade details for the executed trade. The trade message generator 218 may include, in a trade message for each client to an executed trade, a client fee identifier of the client to the executed trade, size and price of the financial asset of the executed trade, time of the executed trade, and a fee stamp as client fee instructions indicating fee rates retrieved from the client fee instruction database 216 for the client to the executed trade. In one embodiment, the client fee instructions for a client may include an exchange fee rate and a clearinghouse fee rate. The trade message may be formatted as data packets in the FIX or FIXML protocol. In one embodiment, the client fee instruction may be data bits in a data packet which have a decimal value that is the same as or corresponds to a fee rate, such an exchange fee rate. For example, the client fee instruction may be a three bit field in a data packet which is a binary code whose decimal value is the exchange fee rate. For example, a client fee instruction of the data bits 010 may be a fee rate 002 that may be directly used in a fee calculation equation, without additional information other than information in a trade message containing the client fee instruction, to determine an exchange fee for a client for an executed trade indicated in the trade message. For example, where the executed trade has a price $30 and size of 1,000, and the fee rate is 002 which is the decimal value of a fee code 010 in the client fee instruction, the exchange fee for the executed trade may be calculated from a fee calculation equation of $(fee rate*size)/100 as $(002*1000)/100 or $20.

The trade message may be configured to identify client fee instructions as corresponding to the client fee identifier of a client to the executed trade. In one example the trade message for an executed trade may be configured to have a client fee identifier in a data packet or bit that immediately precedes a data packet or bits including a client fee instruction indicating the exchange fee rate and clearinghouse fee rate for the client.

The trade message generator 218 may be configured to generate the trade messages respectively for clients to an executed trade following execution of the trade, and transmit, over the communication network 30, the trade messages for the executed trade to each of the clearinghouse 40 and executing broker 50. Each trade message may desirably indicate all fee information from which fees for the executed trade can be calculated for the client, such that the fee information of the client fee instruction, in other words, the fee information within the trade message, may be utilized to accurately calculate fees for the client to the executed trade, without reference to or use of any additional information other than the information in the trade message. The clearinghouse 40 may forward the trade messages for the executed trade over the communication network 30 to the clearing broker 60. Advantageously, fees for a client to an executed trade may be determined by the clearinghouse, the executing broker, and the clearing broker from a client fee instruction in a trade message for the executed trade, without additional information other than information in the trade message. Therefore, the clearinghouse, the executing broker and the clearing broker do not need to: store in memory any fee rate information or client information, such as tables of client information applicable for execution of trades on dates within specific time ranges, and fee tables applicable to the specific time ranges; communicate with an exchange or other computing device to obtain updates to the tables of client information and fee tables and store the updates to the tables in memory; search memory to identify the specific tables to use to calculate fees for an executed trade based on the date of the executed trade; search the memory to obtain the client information representative of trading activity within a predetermined time period based on the identity of the client, such as the client fee identifier; retrieve, from a fee table, the fee rate corresponding to the trader category and trading volume activity indicated in the client information for the client to the executed trade; and calculate the fee for the executed trade with the fee rate retrieved from the fee table.

In one embodiment, the client fee instruction may constitute a fee code corresponding to a fee rate. A recipient of the trade message, such as a clearing broker, may be provided with a mapping table from the exchange that maps fee codes in a client fee instruction to fee rates. A fee code may represent a real time representation of the trader category and volume activity of a client, and the mapping table may map fee rates to fee codes. In this embodiment, the clearing broker may have in memory a single mapping table that is typically updated annually by the exchange 20, and need to reference only this single mapping table to retrieve a fee rate corresponding to the fee code in the trade message. The clearing broker may calculate the fee owed by a client to the executed trade, such as an exchange fee, using the retrieved fee rate and size information in the trade message. In this embodiment, processing, memory, and bandwidth resource usage may be minimized to determine a fee for an executed trade, because the trade message contains the necessary information (fee code) to retrieve a fee rate from a mapping table that includes all fee rates for fee codes that may be included in a client fee instruction of a trade message.

Example Methods

For purposes of illustrating the features of the present disclosure, a high level block diagram of an exemplary process 300 for generating and transmitting a trade message for an executed trade including a client fee instruction indicating a real time fee rate for a client to the executed trade, as shown in FIGS. 3A and 3B, is described below in connection with operations performed at components of the system 10 and the exchange 200 serving as the exchange 20 of the system 10. The process 300 may enable calculation of fees for a client to an executed trade from the client fee instruction in the trade message for the executed trade, desirably without additional information other than information in the trade message, and advantageously avoid the need to store, maintain and distribute over a communication network separate client information tables for clients indicating client fee status based on trader category and trading volume activity during respective particular time periods, and also fee tables for respective time periods indicating fee rates corresponding to different respective client information parameters of trader category and trading volume respectively for the time periods.

Referring to FIG. 3A, in block 302, the controller 202 of the exchange 200 may receive, over the communication network 30, from the executing broker 50, orders of bids and offers for financial assets. An order may be transmitted in an order message including account information indicating identity of the client for the order, and order information including price, size and an identifier of the financial asset that is the subject of the order, and identification information of the executing broker 50. For example, an order message may indicate an order of a bid for a 2-year U.S. Treasury bond futures contract expiring on Jun. 1, 2023 at a price of $100 and size 1000, the executing broker Harold Co., and the account number of a client Joe Java that requested the executing broker to submit the order.

Based on receipt of an order message, the processor 204 may assign a client fee identifier to the order of the order message. The client fee identifier may uniquely identify the client for the order. In addition, the processor 204 may transmit, over the communication network 30 to the executing broker 50, an order acceptance message indicating the order is accepted for matching at the exchange 200 and including the client fee identifier for the order. Further, the processor 204 may provide order information of the order messages to the matching engine 210.

In block 304, the matching engine 210 may, based on the orders of the order messages received at the exchange 200, match bids and offers for financial assets to obtain matched orders, which are processed to generate executed trades at the exchange 200. Continuing with the above example, the matching engine 210 may match the order of a bid for the 2-year U.S. Treasury bond futures contract of a first client with an order of an offer for the same the 2-year U.S. Treasury bond futures contract of a second client to obtain matched orders. After a bid order and an offer order are matched, the matching engine 210 may perform processing that results in execution of a trade of the matched orders for the 2-year U.S. Treasury bond futures contract.

In block 306, the matching engine 210 may generate matching information for each trade executed at the exchange 200. The matching information for each executed trade may indicate a client fee identifier for each of the clients to the executed trade, the financial asset that is the subject of the executed trade, size, and price of the financial asset of the executed trade, and time of execution of the executed trade. For example, for the executed trade of the 2-year U.S. Treasury bond futures contract, the matching information may include the client fee identifiers of the clients Jane Smith and Joe Java, size of 1000, price of $30, an identifier of the executing broker as Harold Co., and identification of the 2-year U.S. Treasury bond futures contract as the financial asset of the executed trade. The matching engine 210 may store the matching information for each executed trade in the memory 206.

In block 308, the exchange 200 may receive in real time, over the communication network 30, from one or more affiliated exchanges 120, external trading data indicating details of trades executed at the affiliated exchanges 120. The external trading data may be received immediately after a trade is executed at an affiliated exchange, or at a predetermined time each day, such as a predetermined time after trading is completed for a business day at the affiliated exchange 120. Desirably, the external trading data for an entire trading day may be received at the exchange 200 very soon after trading is completed on a trading day at the affiliated exchange 120. The external trading data for an external executed trade may include the same or similar details as the matching information for a trade executed at the exchange 200. For example, the external trading data for an external executed trade may indicate client fee identifiers for respective clients to the executed trade, the financial asset that is the subject of the executed trade, size, and price of the financial asset of the executed trade, and time of execution of the executed trade. In one embodiment, the exchange 200 and affiliated exchanges 120 may communicate with one another to assign a single client fee identifier for a same client. The processor 204 may store in the memory 206 the external trading data received from the affiliated exchanges 120.

In block 310, the processor 204 may store in the client database 212 client information indicating real time, updated trading information for clients to executed trades which are indicated in the matching information and the external trading data. In one embodiment, the client information for a client in the client database 212 may indicate a trader category of the client, times, and trading volumes of executed trades of the client, types of financial assets that are the subject of the executed trades and trading volumes respectively for trades executed over predetermined time periods. For example, client information for a client may include liquidity provider as the trader category, trading volumes on respective days, U.S. Treasury bond futures contracts as the type of executed trades, and sums of trading volumes for the client within predetermined periods for U.S. Treasury bond futures contracts, such as sums of trading volumes of U.S. Treasury bond futures contracts of the client for a prior three or six month period. The processor 204 may update the client information for a client in the client database 212 automatically at predetermined intervals, such as every trading day at a time of several hours after trading closes on all exchanges from which the exchange 200 receives external trading data, such as 10 pm in a time zone in which the exchange 200 is located.

In block 312, the processor 204 may store fee rates as fee rate information in the fee database 214. Fee rates in the fee database may be based on one or more factors, including trader category of client, type of financial asset, and trading volume of a type(s) of a financial asset for a predetermined period. In one embodiment, the fee database may include, for a given trader category, exchange fee rates and clearinghouse fee rates for trading volumes for U.S. Treasury bond futures contracts within four different ranges of trading volume over a predetermined period. For example, for the trader category of liquidity provider, exchange fee rates and clearinghouses fee rates for trading volumes of U.S. Treasury bond futures contracts within ranges of 0-10,000, 10,000-100,000, 100,000-500,000, and 500,000-1,000,000 for a six month period may be 0.15 cents and 0.20 cents, 0.10 cents and 0.10 cents, 0.05 cents and 0.07 cents, and 0.01 cents and 0.01 cents, respectively. The fee database 214 may be updated based on fee rate data received over the communication network 30, or input manually at the exchange 200. In an exemplary implementation, the fee database 214 may be updated annually or bi-annually.

In block 314, the processor 204 may automatically, in real time, at predetermined time intervals, determine an updated client fee instruction for each client in the client fee instruction database 216. The client fee instruction for a client may be based on fee rates as the fee rate information in the fee database 214 and the client information for the client in the client database 212. The processor 204 may determine, for a client, based on the trading volume over a predetermined period and trader category of the client in the client database, the exchange and clearinghouse fee rates in the fee database 214 that apply to the trading volume of the client over a predetermined period. For example, the processor 204 may determine the client is a liquidity provider having a trading volume of 550,000 of U.S. Treasury bond futures contracts over the last three months, and from the fee database 214 determine that the client, as a liquidity provider, qualifies for the fee rates for trading volumes between 500,000-1,000, 000 over the last three months. The fee rates for this trading volume range may be lower than ranges with less volume, reflecting incentives, rebates or discounts that become applicable to liquidity providers that trade at volumes exceeding a threshold over a predetermined time period, such as three months. The processor 204 may store the updated client fee instruction in the client fee instruction database 216 for the client, if there is not a client fee instruction for the client in the client fee instruction database 216, or replace the client fee instruction in the client fee instruction database 216 with the updated client fee instruction when the latter is different from the former. In one embodiment, the processor 204 may update the client fee instruction for each client in the client fee instruction database 216, following the close of a trading day at the exchange 200, at a predetermined time after the client information in the client database 212 is updated on the trading day and before the next trading day begins at the exchange 200.

Referring to FIG. 3B, in block 316, for each trade executed at the exchange 200, the trade message generator 218 may obtain details of the executed trade from the memory 206 and client fee instructions for the clients to the executed trade from the client fee instruction database 216. Also in block 316, the trade message generator 218 may generate, for each client to the executed trade, a trade message including details of the executed trade and a fee stamp of client fee instructions for the client to the executed trade indicating fee rates that enable calculation of fees for the client to the executed trade from a fee calculation equation, desirably without additional information other than information in the trade message.

In one embodiment, the trade message generator 218 may, for an executed trade, determine the clients for the executed trade, and retrieve from the client fee instruction database 216, client fee instructions for the clients that indicate fee rates for the respective clients. A trade message for the executed trade may include time, price and size of the executed trade, information indicating the identity of a client to the executed trade, such as a client fee identifier, and fee rates as fee codes in data packets as the client fee instructions for the client to the executed trade. In one embodiment, a fee code may be a three digit binary code whose decimal value corresponds to a fee rate. For example, the fee code may be 010 and correspond to a fee rate of 002 whose actual value may be used in a fee calculation equation to calculate an exchange fee for a client to the executed trade, without the need to obtain additional information for the fee calculation other than the information within the trade message.

In one embodiment, the fee code as the client fee instruction may correspond to an actual value of a fee rate indicated in a mapping table used to retrieve fee rates for a client by, for example, a clearinghouse, as discussed below.

In block 318, the trade message generator 218 may transmit, over the communication network 30, to the clearinghouse 40 and the executing broker 50, the trade messages of block 316 for respective trades executed at the exchange 200. In addition, the clearinghouse 40 may transmit, over the communication network 30, the received trade messages to the clearing broker 60.

In block 320, the clearinghouse 40 and the clearing broker 60 may calculate, for an executed trade indicated in a trade message generated by the exchange 200, fees owed by a client to the executed trade, based on the client fee instructions of the client in the trade message. In one embodiment, a client fee instruction may include a fee code having a decimal value that is an actual fee rate, such that a fee, for example, an exchange fee for a client, may be calculated based on the value indicated by the fee code of the client fee instruction, without additional information other than information in the trade message. Advantageously, the clearinghouse 40, the executing broker 50, and the clearing broker 60 may determine fees for clients for an executed trade with reduced processing, memory and bandwidth resource usage, because, as the trade message contains fee information indicating fee rates that enables calculation of the fees therefrom, the clearinghouse 40, the executing broker 50, and the clearing broker 60 do not need to communicate with an exchange to obtain fee and client information schedules, store the fee and client information schedules in memory, and perform processing to retrieve data in the fee and client information schedules to determine a fee rate that should be applied based on fee rate information in a fee schedule in memory, according to times of trade execution and trading volume. In addition, advantageously, the inclusion of the client fee instruction in the trade message to enable calculation of fees therefrom eliminates the need for, in an electronic trading exchange system, the clearing broker 60 to use processing, memory and bandwidth resources to confirm and reconcile with the executing broker fees owed by clients for executed trades. Continuing with the above example, the decimal value 002 of the fee code 010 constituting a client fee instruction for a client may be used in a fee calculation for an executed trade of a U.S. Treasury bond futures contract of size 1000 and price $30, to determine the fee as follows: $(002*1000)/100 or $20.

Advantageously, the technical problem of determining in real time fees for clients to executed trades, based on fee rates corresponding to current, real time trade volume information for a client, accurately, quickly and with low processing latency and minimized usage of processing, storage and bandwidth resources, is solved by the technical solution of the present disclosure of including client fee instructions in a trade message that enable calculation of fees for a client to the executed trade from the information of the trade message, desirably without additional information other than information in the trade message.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein. Rather, various steps can be handled in a different order or simultaneously, and steps may be omitted or added.

The invention claimed is:

1. An electronic trading exchange apparatus comprising:
a memory including a client database, a fee database, and a client fee instruction database; and
at least one processor configured to:
receive, over a communication network, from a plurality of computing devices of respective clients, orders including bids and offers for financial assets;
match bids and offers for financial assets of respective clients;
generate matching information indicating executed trades resulting from matching orders of bids and offers for financial assets at the electronic trading exchange apparatus, in which the matching information indicates, for each executed trade, size and time of the executed trade and clients that are parties to the executed trade;
receive in real time, over the communication network, external trading data indicating external executed trades resulting from matched orders of bids and offers for financial assets at another electronic trading exchange apparatus external to the electronic trading exchange apparatus, wherein the external trading data for a given external executed trade includes size and time of the given external executed trade and clients that are parties to the given external executed trade;
update in real time, for each client in the client database, client information indicating a trading volume of the client and a time of the trading volume, in which the client information is updated based on the external trading data and the matching information; in real time, determine, for a given client in the client database, an updated client fee instruction based on fee rate information in the fee database and the client information for the given client in the client database, and update a client fee instruction for the given client in the client fee instruction database, in accordance with the updated client fee instruction for the given client;

generate, for each executed trade, based on first and second client fee instructions in the client fee instruction database of respective first and second clients that are parties to the executed trade, first and second trade messages respectively including the first and second client fee instructions and information identifying the first and second clients, in which each of the first and second trade messages includes time, size and price of the executed trade, and in which the first and second client fee instructions are configured to enable calculation of first and second fees respectively for the first and second clients for the executed trade without additional information other than information in the first and second trade messages; and transmit, over the communication network, the first and second trade messages for each executed trade to a clearinghouse device.

2. The electronic trading exchange apparatus of claim 1, in which each of the first and second client fee instructions includes first and second fee information as a three bit code representative of respective first and second values, and in which the first fee is a function of the first value and the size of the executed trade, and the second fee is a function of the second value and the size of the executed trade.

3. The electronic trading exchange apparatus of claim 2, in which the first fee is based on a product of the first value and the size of executed trade.

4. The electronic trading exchange apparatus of claim 1, in which a first given updated client fee instruction for a first given client is determined at a first predetermined time, in which a second given updated client fee instruction for a second given client is determined at a second predetermined time different from the first predetermined time, and in which the first and second predetermined times are based on first and second trade volumes over a predetermined period respectively for the first and second clients indicated in the client database.

5. The electronic trading exchange apparatus of claim 1, in which a given client fee instruction for a given client in the client fee instruction database is updated based on a determination that the given client fee instruction for the given client is not the same as an update to the given client fee instruction.

6. The electronic trading exchange apparatus of claim 1, wherein the financial assets include futures and derivative contracts.

7. The electronic trading exchange apparatus of claim 1, wherein given client information for a given client in the client database indicates a trader category, in which the trader category includes at least one of a liquidity provider or a liquidity taker.

8. The electronic trading exchange apparatus of claim 1, in which a given client fee instruction for the given client in the client fee instruction database indicates a given code whose decimal value is a given fee rate.

9. A method for electronic trading comprising:

controlling, by at least one processor of an electronic trading exchange apparatus, in which the electronic trading exchange apparatus includes a memory including a client database, a fee database and a client fee instruction database;

receiving, over a communication network, from a plurality of computing devices of respective clients, orders including bids and offers for financial assets;

matching bids and offers for financial assets of respective clients;

generating matching information indicating executed trades resulting from matching orders of bids and offers for financial assets at the electronic trading exchange apparatus, in which the matching information indicates, for each executed trade, size and time of the executed trade and clients that are parties to the executed trade;

receiving in real time, over the communication network, external trading data indicating external executed trades resulting from matched orders of bids and offers for financial assets at another electronic trading exchange apparatus external to the electronic trading exchange apparatus, wherein the external trading data for a given external executed trade includes size and time of the given external executed trade and clients that are parties to the given external executed trade;

updating in real time, for each client in a client database, client information indicating a trading volume of the client and a time of the trading volume, in which the client information is updated based on the external trading data and the matching information; in real time, determining, for a given client in the client database, an updated client fee instruction based on fee rate information in a fee database and the client information for the given client in the client database, and updating a client fee instruction for the given client in a client fee instruction database, in accordance with the updated client fee instruction for the given client;

generating, for each executed trade, based on first and second client fee instructions in the client fee instruction database of respective first and second clients that are parties to the executed trade, first and second trade messages respectively including the first and second client fee instructions and identification information identifying the first and second clients, in which each of the first and second trade messages includes time, size and price of the executed trade, and in which the first and second client fee instructions are configured to enable calculation of first and second fees respectively for the first and second clients for the executed trade without additional information other than information in the first and second trade messages; and transmitting, over the communication network, the first and second trade messages for each executed trade to a clearinghouse device.

10. The method of claim 9, in which each of the first and second client fee instructions includes first and second fee information as a three bit code representative of respective first and second values, and in which the first fee is a function of the first value and the size of the executed trade, and the second fee is a function of the second value and the size of the executed trade.

11. The method of claim 10, in which the first fee is based on a product of the first value and the size of executed trade.

12. The method of claim 9, in which a first given updated client fee instruction for a first given client is determined at a first predetermined time, in which a second given updated client fee instruction for a second given client is determined at a second predetermined time different from the first predetermined time, and in which the first and second predetermined times are based on first and second trade volumes over a predetermined period respectively for the first and second clients indicated in the client database.

13. The method of claim 9, in which a given client fee instruction for a given client in the client fee instruction database is updated based on a determination that the given client fee instruction for the given client is not the same as an update to the given client fee instruction.

14. The method of claim 9, wherein the financial assets include futures and derivative contracts.

15. The method of claim 9, wherein given client information for a given client in the client database indicates a trader category, in which the trader category includes at least one of a liquidity provider or a liquidity taker.

16. The method of claim 9, in which a given client fee instruction for the given client in the client fee instruction database indicates a given code whose decimal value is a given fee rate.

17. The method of claim 9, wherein given client information for a given client is indicated by a given client fee identifier.

* * * * *